(12) United States Patent
Seo et al.

(10) Patent No.: US 7,835,623 B2
(45) Date of Patent: Nov. 16, 2010

(54) RECORDING MEDIUM HAVING DATA STRUCTURE FOR MANAGING REPRODUCTION OF VIDEO DATA RECORDED THEREON

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1083 days.

(21) Appl. No.: 10/456,476

(22) Filed: Jun. 9, 2003

(65) Prior Publication Data

US 2003/0235402 A1 Dec. 25, 2003

(30) Foreign Application Priority Data

Jun. 21, 2002 (KR) ...................... 10-2002-0035009

(51) Int. Cl.
*H04N 5/91* (2006.01)
(52) U.S. Cl. ............................. 386/95; 386/45; 386/46; 386/96; 386/125
(58) Field of Classification Search .................. 386/88, 386/125, 126, 83, 95, 96, 45, 46
See application file for complete search history.

(56) References Cited

U.S. PATENT DOCUMENTS 5,521,898 A 5/1996 Ogasawara
5,583,652 A 12/1996 Ware
5,602,956 A 2/1997 Suzuki et al.
5,630,006 A 5/1997 Hirayama et al.
5,633,839 A * 5/1997 Alexander et al. .......... 700/234
5,691,972 A 11/1997 Tsuga et al.
5,734,788 A 3/1998 Nonomura et al.
5,742,569 A 4/1998 Yamamoto et al.
5,784,528 A 7/1998 Yamane et al.

(Continued)

FOREIGN PATENT DOCUMENTS

CN 1205793 1/1993

(Continued)

OTHER PUBLICATIONS

International Search Report, Dated Jul. 30, 2003.

(Continued)

*Primary Examiner*—Jamie J Atala
(74) *Attorney, Agent, or Firm*—Harness, Dickey & Pierce, P.L.C.

(57) ABSTRACT

The data structure for managing reproduction of at least video data recorded on the recording medium includes a general information file area storing at least one general information file. The general information file includes at least one playlist identifier identifying a playlist file forming a title of video data recorded on the recording medium and title management information for managing reproduction of the video data by title. A playlist directory area stores at least one playlist directory, and each playlist directory includes at least one playlist file identified by a playlist identifier in the general information file. Each playlist file identifies at least one playitem, and each playitem identifies a clip of the video data.

22 Claims, 8 Drawing Sheets

U.S. PATENT DOCUMENTS

| | | | |
|---|---|---|---|
| 5,796,910 A | 8/1998 | Nagano et al. | |
| 5,884,004 A * | 3/1999 | Sato et al. | 386/98 |
| 5,907,658 A | 5/1999 | Murase et al. | |
| 5,913,010 A | 6/1999 | Kaneshige et al. | |
| 5,917,781 A | 6/1999 | Kim | |
| 5,923,869 A | 7/1999 | Kashiwagi et al. | |
| 5,933,410 A | 8/1999 | Nakane et al. | |
| 5,953,290 A | 9/1999 | Fukuda et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A * | 7/2000 | Hunt | 715/500.1 |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,215,746 B1 | 4/2001 | Ando et al. | |
| 6,219,488 B1 | 4/2001 | Mori et al. | |
| 6,247,022 B1 | 6/2001 | Yankowski | |
| 6,285,825 B1 | 9/2001 | Miwa et al. | |
| 6,292,226 B1 | 9/2001 | Yamanaka et al. | |
| 6,308,005 B1 * | 10/2001 | Ando et al. | 386/95 |
| 6,321,027 B2 | 11/2001 | Honji | |
| 6,336,002 B1 | 1/2002 | Yamauchi et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,385,388 B1 | 5/2002 | Lewis et al. | |
| 6,385,389 B1 * | 5/2002 | Maruyama et al. | 386/95 |
| 6,392,969 B1 | 5/2002 | Heo | |
| 6,393,430 B1 | 5/2002 | Van Ryzin | |
| 6,415,101 B1 | 7/2002 | DeCarmo | |
| 6,424,793 B1 | 7/2002 | Setogawa et al. | |
| 6,424,797 B1 | 7/2002 | Murase et al. | |
| 6,532,334 B1 | 3/2003 | Kikuchi et al. | |
| 6,570,837 B1 | 5/2003 | Kikuchi et al. | |
| 6,580,870 B1 | 6/2003 | Kanazawa et al. | |
| 6,584,277 B2 | 6/2003 | Tsumagari et al. | |
| 6,615,192 B1 | 9/2003 | Tagawa et al. | |
| 6,647,496 B1 | 11/2003 | Tagawa et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,795,499 B1 | 9/2004 | Kato et al. | |
| 6,798,981 B1 | 9/2004 | Yamauchi et al. | |
| 6,832,293 B1 | 12/2004 | Tagawa et al. | |
| 6,859,421 B2 | 2/2005 | Hamamoto et al. | |
| 6,904,227 B1 | 6/2005 | Yamamoto et al. | |
| 6,912,218 B1 | 6/2005 | Jeon | |
| 6,914,863 B2 | 7/2005 | Ono | |
| 6,915,067 B2 * | 7/2005 | Tanaka et al. | 386/95 |
| 6,965,727 B1 | 11/2005 | Sawabe et al. | |
| 6,999,674 B1 * | 2/2006 | Hamada et al. | 386/95 |
| 7,006,758 B1 | 2/2006 | Yamamoto et al. | |
| 7,050,384 B2 | 5/2006 | Sasaki | |
| 7,065,287 B1 | 6/2006 | Heredia et al. | |
| 7,113,694 B2 | 9/2006 | Kim et al. | |
| 7,236,687 B2 | 6/2007 | Kato et al. | |
| 7,565,060 B2 * | 7/2009 | Hamada et al. | 386/98 |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0036358 A1 | 11/2001 | Kim et al. | |
| 2001/0043790 A1 | 11/2001 | Saeki et al. | |
| 2001/0053280 A1 | 12/2001 | Yamauchi et al. | |
| 2002/0018416 A1 | 2/2002 | Heo | |
| 2002/0041557 A1 | 4/2002 | Heo | |
| 2002/0046328 A1 | 4/2002 | Okada | |
| 2002/0093556 A1 | 7/2002 | Ishizawa et al. | |
| 2002/0093886 A1 | 7/2002 | Ijichi et al. | |
| 2002/0106196 A1 | 8/2002 | Yamauchi et al. | |
| 2002/0126994 A1 * | 9/2002 | Gunji et al. | 386/83 |
| 2002/0129036 A1 | 9/2002 | Lok et al. | |
| 2002/0135608 A1 | 9/2002 | Hamada et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2003/0035681 A1 | 2/2003 | Ho | |
| 2003/0058948 A1 | 3/2003 | Kelly et al. | |
| 2003/0103604 A1 * | 6/2003 | Kato et al. | 379/68 |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0147322 A1 | 8/2003 | Ono | |
| 2003/0161615 A1 | 8/2003 | Tsumagari et al. | |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 | 3/2004 | Okada et al. | |
| 2004/0047591 A1 * | 3/2004 | Seo et al. | 386/46 |
| 2004/0076402 A1 | 4/2004 | Jung et al. | |
| 2004/0114908 A1 | 6/2004 | Ito | |
| 2004/0120694 A1 | 6/2004 | Hamada et al. | |
| 2004/0156621 A1 | 8/2004 | Seo et al. | |
| 2004/0208135 A1 | 10/2004 | Nakamura et al. | |
| 2004/0213105 A1 * | 10/2004 | Seo et al. | 369/47.16 |
| 2004/0220791 A1 | 11/2004 | Lamkin et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2006/0013564 A1 | 1/2006 | Hamada et al. | |
| 2006/0110132 A1 | 5/2006 | Takakuwa et al. | |
| 2006/0140079 A1 | 6/2006 | Hamada et al. | |
| 2006/0158969 A1 | 7/2006 | Hamada et al. | |
| 2006/0222340 A1 | 10/2006 | Yamauchi et al. | |

FOREIGN PATENT DOCUMENTS

| | | |
|---|---|---|
| CN | 1163673 | 10/1997 |
| CN | 1212427 | 3/1999 |
| CN | 1220458 | 6/1999 |
| CN | 1239574 | 12/1999 |
| CN | 1251680 | 4/2000 |
| CN | 1272209 | 11/2000 |
| CN | 1310445 | 8/2001 |
| CN | 1317200 | 10/2001 |
| CN | 1320926 | 11/2001 |
| CN | 1346491 | 4/2002 |
| CN | 1364387 | 8/2002 |
| CN | 1383679 | 12/2002 |
| CN | 1393872 | 1/2003 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606356 | 4/2005 |
| CN | 1606357 | 4/2005 |
| CN | 1611071 | 4/2005 |
| EP | 0723216 | 7/1996 |
| EP | 0724264 | 7/1996 |
| EP | 0737009 | 10/1996 |
| EP | 0831647 | 3/1998 |

| | | | | | | |
|---|---|---|---|---|---|---|
| EP | 0836183 | 4/1998 | | JP | 2004-127397 | 4/2004 |
| EP | 0836189 | 4/1998 | | JP | 2005-513936 | 5/2005 |
| EP | 0858073 | 8/1998 | | JP | 2005-251392 | 9/2005 |
| EP | 0872839 | 10/1998 | | KR | 1996-0038743 | 11/1996 |
| EP | 0911825 | 4/1999 | | KR | 1996-0038744 | 11/1996 |
| EP | 1024494 | 8/2000 | | KR | 1996-0038901 | 11/1996 |
| EP | 1050880 | 11/2000 | | KR | 1996-0038905 | 11/1996 |
| EP | 1103974 | 5/2001 | | KR | 1999-0022858 | 10/1997 |
| EP | 1126454 | 8/2001 | | KR | 1999-0079482 | 11/1999 |
| EP | 1041565 | 9/2001 | | KR | 2000-0053633 | 8/2000 |
| EP | 1148503 | 10/2001 | | KR | 2001-0022702 | 3/2001 |
| EP | 1041569 | 1/2002 | | KR | 2001-0028735 | 4/2001 |
| EP | 1198132 | 4/2002 | | KR | 2001-0051898 | 6/2001 |
| EP | 1198133 | 4/2002 | | KR | 2001-0098007 | 11/2001 |
| EP | 1 205 933 A2 | 5/2002 | | KR | 2001-0107578 | 12/2001 |
| EP | 1271526 | 1/2003 | | KR | 2002-0006273 | 1/2002 |
| EP | 1280348 | 1/2003 | | KR | 2002-0020919 | 3/2002 |
| EP | 1391119 | 2/2004 | | KR | 2002-0097454 | 12/2002 |
| EP | 1398965 | 3/2004 | | KR | 2002-0097455 | 12/2002 |
| EP | 1469677 | 10/2004 | | WO | WO 97/13366 | 4/1997 |
| EP | 0949622 | 12/2006 | | WO | WO 97/14151 | 4/1997 |
| JP | 8-273304 | 10/1996 | | WO | WO 97/15924 | 5/1997 |
| JP | 09-135421 | 5/1997 | | WO | WO 97/37491 | 10/1997 |
| JP | 10-032780 | 2/1998 | | WO | WO 97/38527 | 10/1997 |
| JP | 10-040667 | 2/1998 | | WO | WO 97/39451 | 10/1997 |
| JP | 11-069308 | 3/1999 | | WO | WO 99/08281 | 2/1999 |
| JP | 11-069309 | 3/1999 | | WO | WO 99/38169 | 7/1999 |
| JP | 11-096653 | 4/1999 | | WO | WO 00/05883 | 2/2000 |
| JP | 11-120747 | 4/1999 | | WO | WO 00/46803 | 8/2000 |
| JP | 11-161663 | 6/1999 | | WO | WO 00/60597 | 10/2000 |
| JP | 11-213522 | 8/1999 | | WO | WO 01/35648 | 5/2001 |
| JP | 11-213627 | 8/1999 | | WO | WO 01/52554 | 7/2001 |
| JP | 11-259985 | 9/1999 | | WO | WO 01/82604 | 11/2001 |
| JP | 11-296997 | 10/1999 | | WO | WO 01/82606 | 11/2001 |
| JP | 2000-021130 | 1/2000 | | WO | WO 01/82610 | 11/2001 |
| JP | 2000-067522 | 3/2000 | | WO | WO 01/82611 | 11/2001 |
| JP | 2000-149405 | 5/2000 | | WO | WO 02/075739 A1 | 9/2002 |
| JP | 2000-195235 | 7/2000 | | WO | WO 02/080541 | 10/2002 |
| JP | 2000-222822 | 8/2000 | | WO | WO 03/047261 | 6/2003 |
| JP | 2000-235779 | 8/2000 | | WO | WO 03/058957 | 7/2003 |
| JP | 2000-235780 A | 8/2000 | | WO | WO 2004/001728 | 12/2003 |
| JP | 2000-322827 | 11/2000 | | WO | WO 2004/001750 | 12/2003 |
| JP | 2000-331466 | 11/2000 | | WO | WO 2004/001752 | 12/2003 |
| JP | 2000-348442 | 12/2000 | | WO | WO 2004/001753 | 12/2003 |
| JP | 2001-024985 | 1/2001 | | WO | WO 2004/001754 | 12/2003 |
| JP | 2001-157145 | 6/2001 | | WO | WO 2004/032142 | 4/2004 |
| JP | 2001-157208 | 6/2001 | | WO | WO 2004/047100 | 6/2004 |
| JP | 2001-169246 | 6/2001 | | WO | WO 2004/088661 | 10/2004 |
| JP | 2001-195809 | 7/2001 | | | | |
| JP | 2001-332006 | 11/2001 | | | | |
| JP | 2001-359072 | 12/2001 | | | | |
| JP | 2002-025231 A | 1/2002 | | | | |
| JP | 2002-082838 | 3/2002 | | | | |
| JP | 2002-083486 | 3/2002 | | | | |
| JP | 2002-112201 | 4/2002 | | | | |
| JP | 2002-150685 | 5/2002 | | | | |
| JP | 2002-158972 | 5/2002 | | | | |
| JP | 2002-158974 | 5/2002 | | | | |
| JP | 2002-222581 | 8/2002 | | | | |
| JP | 2002-352515 | 12/2002 | | | | |
| JP | 3392838 | 1/2003 | | | | |
| JP | 3392849 | 1/2003 | | | | |
| JP | 2003-68057 | 3/2003 | | | | |
| JP | 2003-199047 | 7/2003 | | | | |
| JP | 2003-520514 | 7/2003 | | | | |
| JP | 3379961 | 12/2003 | | | | |

OTHER PUBLICATIONS

Office Action for corresponding Japanese application dated May 7, 2008.
Japanese Office Action corresponding to Japanese Application No. 2004-553264 dated Sep. 16, 2008.
Australian Office Action corresponding to Australian Application No. 2003240036 dated Sep. 11, 2008.
Australian Office Action corresponding to Australian Application No. 2003228113 dated Sep. 17, 2008.
European Search Report dated Sep. 12, 2008.
Japanese Office Action dated Jun. 20, 2008.
Japanese Office Action dated Jun. 27, 2008.
Japanese Office Action dated May 20, 2008.
European Search Report dated Jun. 16, 2009.

* cited by examiner

*info.dvp - syntax*

| info.dvp { |
|---|
| version_number |
| TableOfPlayLists_start_address |
| reserved_for_future_use |
| ⋮ |
| TableOfPlayLists(){ |
|     length |
|     number_of_PlayLists |
|     for(I=0; i<number_of_PlayLists; i++){ |
|         PlayList_file_name |
|         Title_entry_flag |
|     } |
| } |
| ⋮ |

FIG. 4

| ⋮ |
|---|
| TitleEntryTable(){ |
|     length |
|     number_of_Titles |
|     for(I=0; i<number_of_Titles; i++){ |
|         Entry_PlayList_file_name |
|     } |
| } |
| ⋮ |

*.rpls - syntax

| xxxxx.rpls { |
|---|
| version_number |
| . . . . . . . |
| PlayListsMark(){ |
| length |
| number_of_PlayList_marks |
| for(I=0; i<number_of_PlayList_marks; i++){ |
| . . . . . . . |
| mark_type     ●——— *0x05 (Chapter-mark)* |
| maker_ID |
| ref_to_PlayItem_id |
| mark_time_stamp |
| duration |
| . . . . . . . |
| : |

FIG. 9

*.rpls - syntax*

| xxxxx.rpls { |
|---|
| version_number |
| . . . . . . |
| PlayList(){ |
| length |
| . . . . . . |
| number_of_PlayItems |
| for(i=0; i<number_of_Playitems; i++){ |
| PlayItem() |
| : |

| PlayItem(){ |
|---|
| length |
| . . . . |
| Path_number |
| . . . . |

RECORDING MEDIUM HAVING DATA STRUCTURE FOR MANAGING REPRODUCTION OF VIDEO DATA RECORDED THEREON

BACKGROUND OF THE INVENTION

1. Field of the Invention

The present invention relates to a recording medium having a data structure for managing reproduction of at least video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

Figure 1:
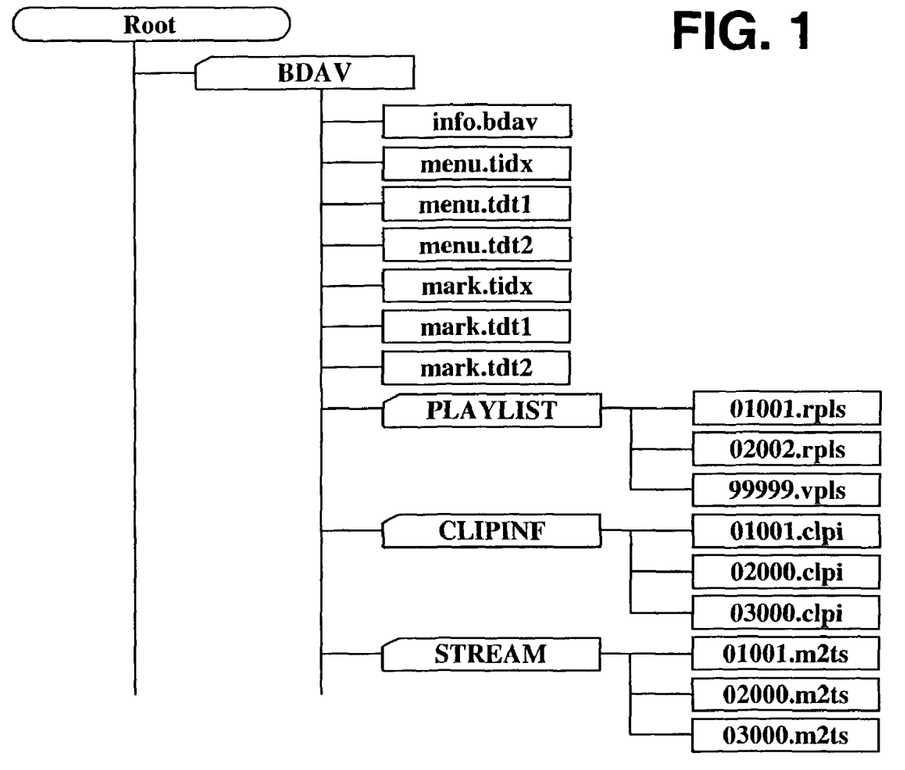
FIG. 1 illustrates the prior art file or data structure of a rewritable optical disk according to the Blu-ray Disc Rewritable (BD-RW) standard.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.dvr is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlist (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provide general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

In the data structure according to the present invention, a general information file is recording in a general information file area of the recording medium. The general information identifies playlists recorded on the recording medium and may include title management information for managing reproduction of the video data represented by the playlists by title. In one exemplary embodiment the title management information indicates which playlists belong to which titles. In one exemplary embodiment, the title management information creates a one-to-one correspondence between titles and playlists.

In the data structure according to the present invention, the playlists may include chapter management information for managing reproduction of the titles by chapter. In one exemplary embodiment, the chapter management information includes a chapter entry flag associated with each playitem in a playlist, where the chapter entry flag indicates whether the playitem begins a chapter. In another exemplary embodiment, the chapter management information includes a field of information in the playlist indicating the number of chapters and a time in the video data when each chapter begins.

The data structure according to the present invention may also include path management information in the playlists for managing reproduction of multiple reproduction path video data. In one exemplary embodiment, each playitem includes information identifying the paths to which the playitem belongs.

The present invention further provides apparatuses and methods for recording and reproducing the data structure according to the present invention.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In order that the invention may be fully understood, preferred embodiments thereof will now be described with reference to the accompanying drawings.

Figure 2:
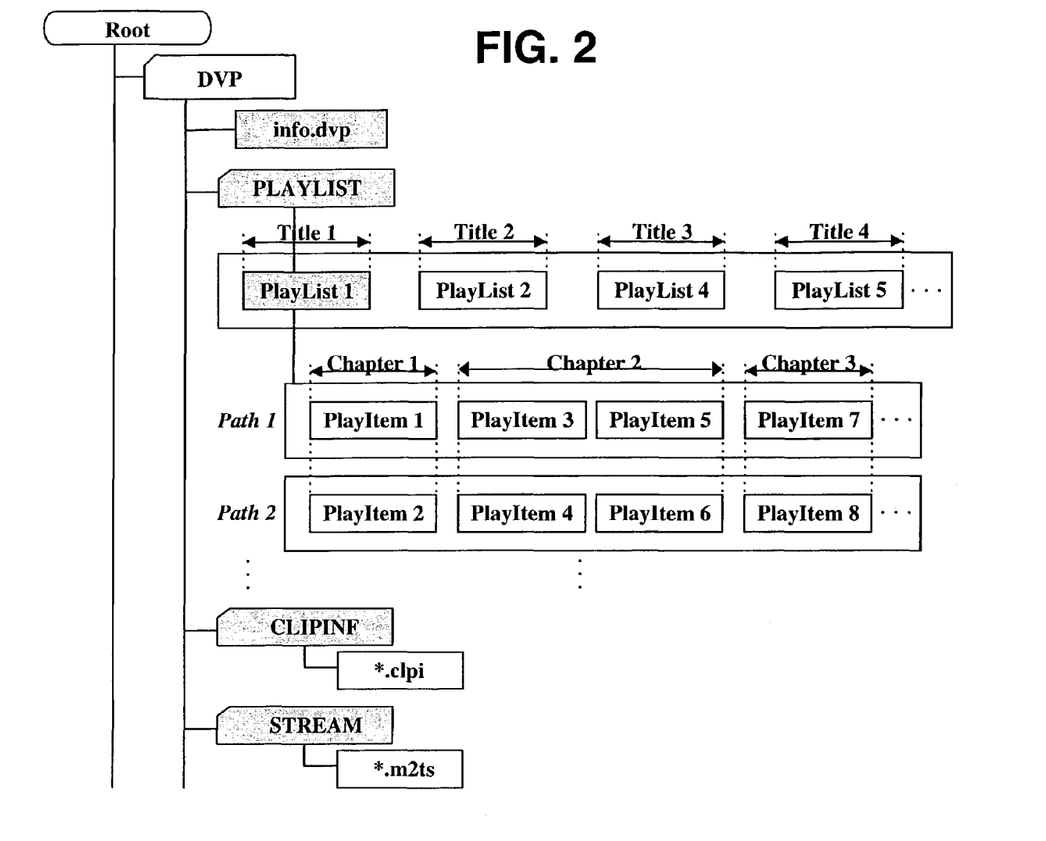
FIGS. 2 to 5 illustrate a first embodiment of a recording medium having a data or file structure for managing reproduction of at least video data in accordance with the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file 'info.dvp', a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts) corresponding to the clip information files are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlist (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provide general information for managing the reproduction of the A/V stream recorded on the optical disk. More specifically, the info.bdav file includes, among other things, a table of playlists that identifies the files names of the playlist in the PLAYLIST directory of the same DVP directory. The info.dvp file will be discussed in greater detail below with respect to the embodiments of the present invention.

Figure 10:
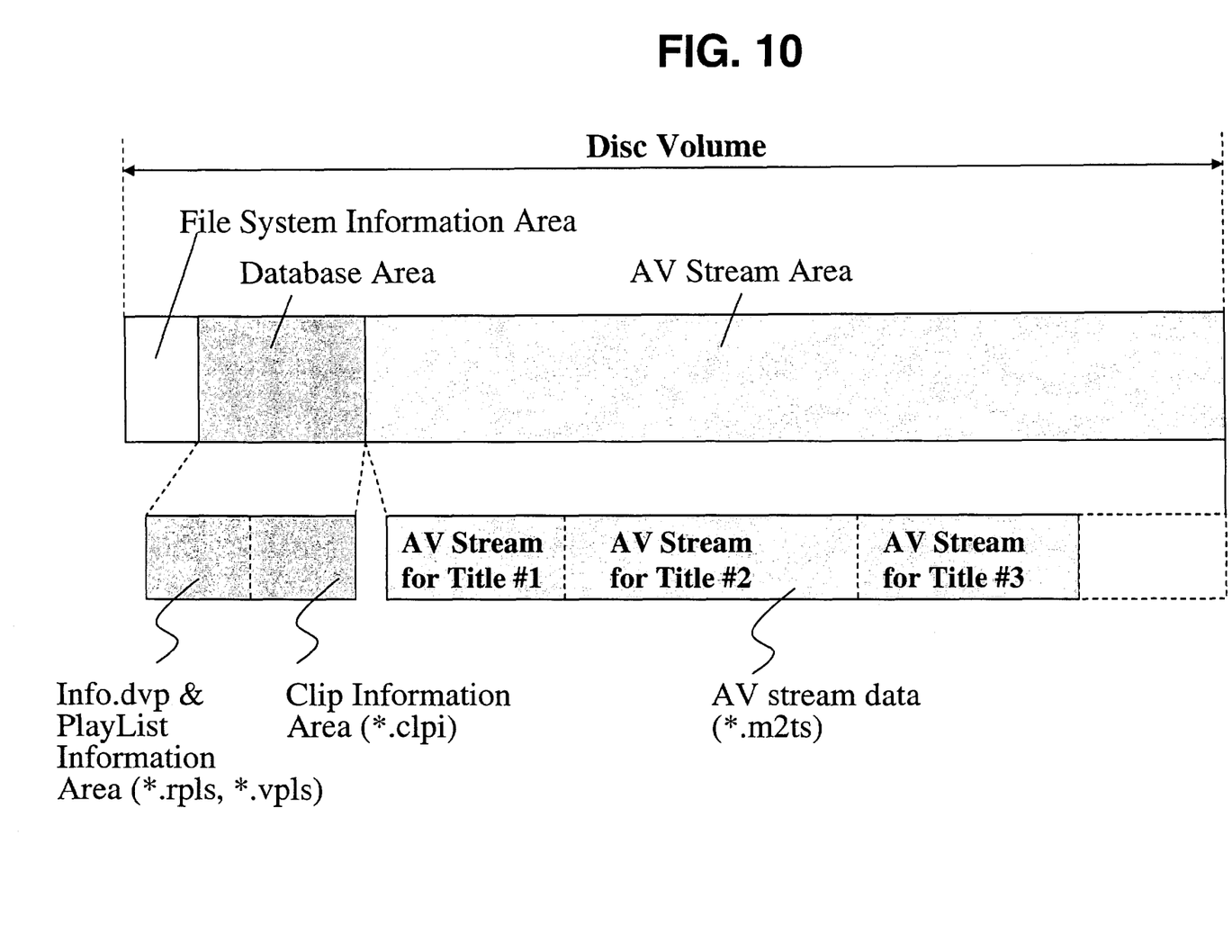
FIG. 10 illustrates an example of a recording medium having the data structure of FIG. 3 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 10 illustrates an example of a recording medium having the data structure of FIG. 3 stored thereon. As shown, the recording medium includes a file system information area, a data base area and an A/V stream area. The data base area includes a general information file and playlist information area and a clip information area. The general information file and playlist area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

As shown in FIG. 2, and as will be described in greater detail below with respect to FIGS. 3-5, the general information file info.dvp includes title management information for managing reproduction of the video and audio data by title and the playlists include chapter management information for managing reproduction of a title by chapters.

Because of the large storage capacity of the newer, high-density recording media such as BD-ROM optical disks, various versions of a title or portions of a title may be recorded, and therefore, reproduced from the recording media. For example, video data representing different camera angles may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that camera angle and parental control versions are but two examples of multiple reproduction path video data, and the present invention is applicable to any type or combination of types of multiple reproduction path video data. As will be described in detail below with respect to FIGS. 2-5, in an embodiment of the present invention, each playlist file includes path management information for managing reproduction of multiple reproduction path video data recorded on the recording medium.

According to a first embodiment of the present invention, as illustrated in FIG. 2, each title may be associated with a single playlist in the PLAYLIST directory and each chapter in a title may be linked with at least one playitem included in a playlist.

In the example of FIG. 2, the first and the second playitems among playitems included in the first playlist 'PlayList 1' refer to the first chapter, the third to the sixth playitems refer to the second chapter, and the seventh and the eight playitems refer to the third chapter. Also, FIG. 2 shows a first production path is indicated by the odd playitems 'PlayItem 1, 3, 5, 7' and a second reproduction path is indicated by the even playitems 'PlayItem 2, 4, 6, 8'. This is merely an example, and is not limiting on the path structure permitted by the present invention.

Figure 3:
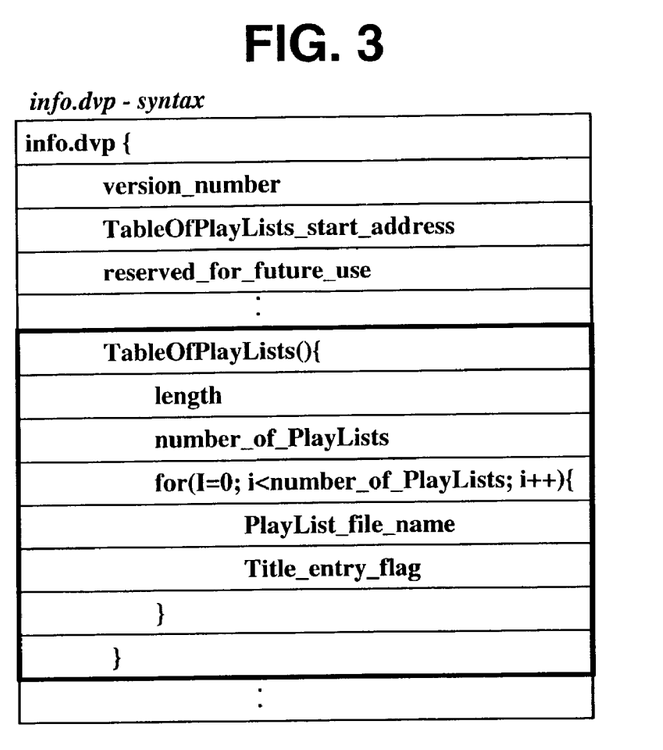

FIG. 3 illustrates a portion of the general information file info.dvp according to an embodiment of the present invention in greater detail. As shown, the general information file info.dvp includes an information field called 'TableOfPlaylists'. The playlist table 'TableOfPlaylists' indicates the length of the information field, and the number playlists in the DVP directory. For each playlist, the playlist table 'TableOfPlaylists' indicates the file name 'PlayList_file_name' of the playlist (which identifies the playlist) and title management information associated with the playlist. Specifically, the title management information is a title entry flag 'Title_entry_flag', which indicates whether the playlist is the start of a title. In the exemplary embodiment of FIG. 2 where each title is associated with a single playlist, the title entry flag 'Title_entry_flag' is set for each playlist. However, it will be understood that the present invention is not limited to this embodiment.

Figure 4:
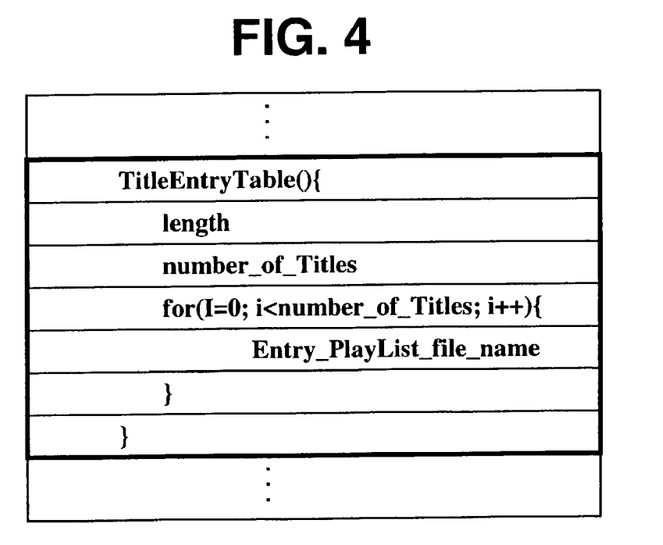

The title management information also includes a title entry table 'TitleEntryTable' forming a portion of the general information file 'info.dvp' as shown in FIG. 4. As shown, the title entry table indicates the length of this information field, indicates the number of titles 'number_of_Titles', and for each title, indicates the filenames of the first playlist 'Entry_PlayList_file_name' associated with the title. In an alternate embodiment, the title entry table is written in a file separate from the general information file 'info.dvp'.

Figure 5:
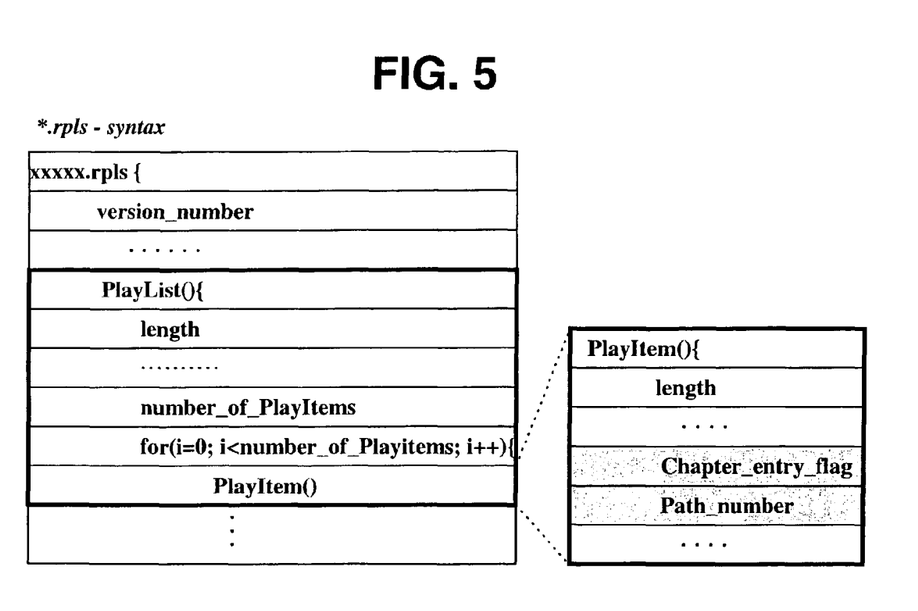

The chapter management information, which is used for selectively referring to a chapter of each title, is written in a corresponding playlist file structured as shown in FIG. 5. FIG. 5 also shows an exemplary embodiment where path management information, which is used for managing the reproduction of multiple reproduction path video data of a title, is written in the playlist file.

As shown, each playlist file indicates a length of the file, and the number of playitems 'number_of_PlayItems' forming the playlist. For each playitem, a playitem information field is provided in the playlist file. Here each playitem is identified by the number of the playitem. As shown in FIG. 5, the playitem information field includes, in part, an indication of the field's length, a chapter entry flag 'Chapter_entry_flag' and a path number 'Path_number'. The chapter entry flag 'Chapter_entry_flag' provides chapter management information by indicating whether the associated playitem is the start of a chapter. The path number 'Path_number' provides the path management information by indicating the path or paths to which the associated playitem belongs.

Figure 6:
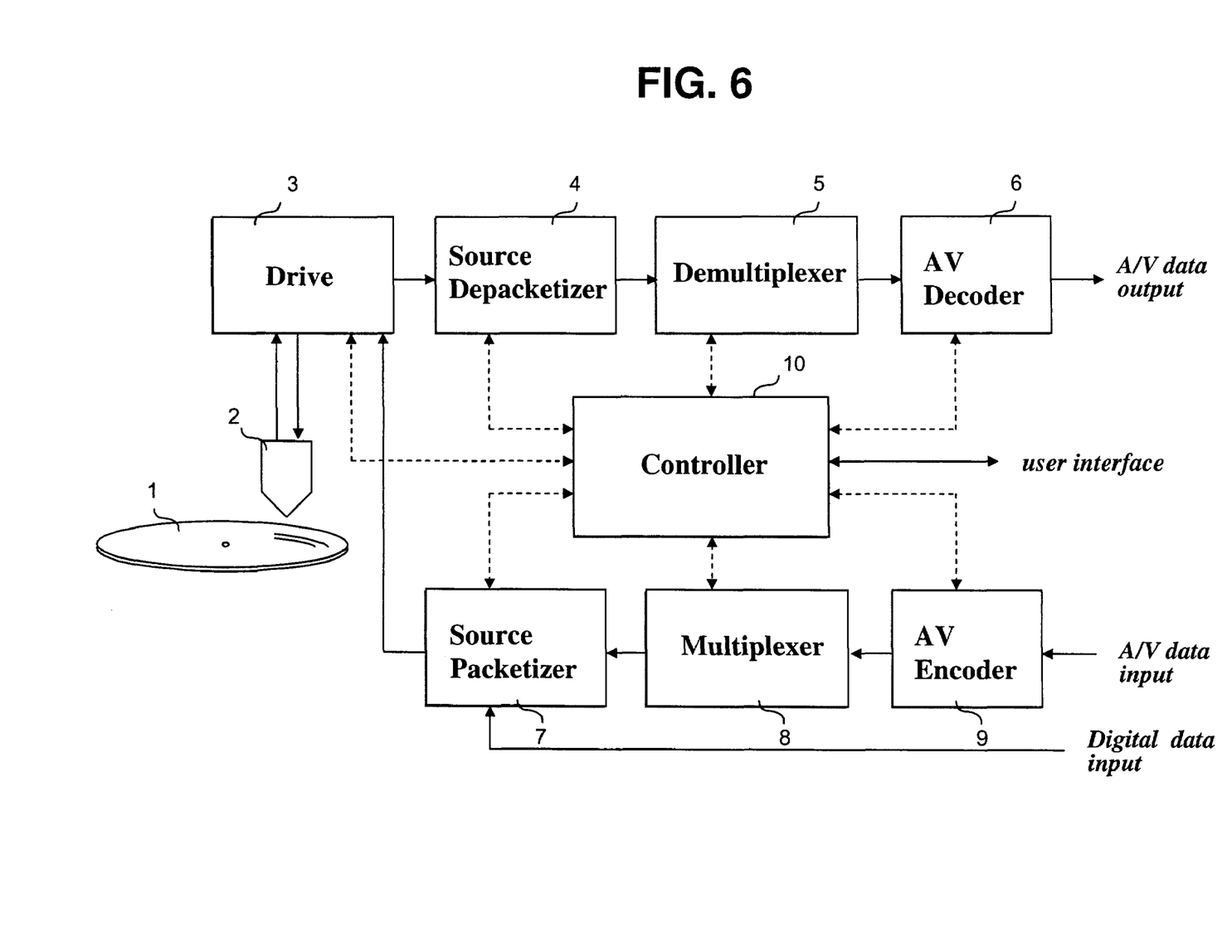
FIG. 6 illustrates a schematic diagram of an embodiment of an optical disk recording and reproduction apparatus of the present invention.

FIG. 6 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2-5 on the optical disk.

During reproduction, the controller 10 controls the drive 3 to reproduce this data structure. Based on the information contain therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a title, chapter, and/or path to reproduce. This user input may be specified, for example, via a menu based graphical user interface preprogrammed into the controller 10. Using the user input and the title management information, chapter management information and/or path management information reproduced from the optical disk, the controller 10 controls the reproduction of the specified title, chapter and/or path.

For example, to select a particular title, the controller 10 determines from the title entry table the number of titles and requests the user to select one based on the number. As will be appreciated, the general information file may be augmented to contain more meaningful information (such as a title name) for the titles recorded on the recording medium, and this information could be provided to the user in conjunction with the title selection request. Once a title is selected, the playlist file name for the selected title is obtained from the title entry table and reproduction according to the identified playlist is performed.

To select a particular chapter, the chapter entry flag for each playitem is examined by the controller 10 to determine the number of chapters and the user is queried on which chapter to reproduce. As with the title selection, the chapter management information may be augmented to provide more meaningful information regarding the chapters. Selection of a particular chapter is a selection to begin reproduction at the associated playitem, and reproduction begins with the associated playitem.

To select a particular path, the path numbers for each playitem are examined by the controller 10 to determine the number of reproduction paths, and the user is requested which path to reproduce. As with the title and chapter selections, the path management information may be augmented to provide more meaningful information regarding the reproduction path to reproduce. During reproduction, only those playitems having the selected path number as one of their path numbers are reproduced.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

Figure 7:
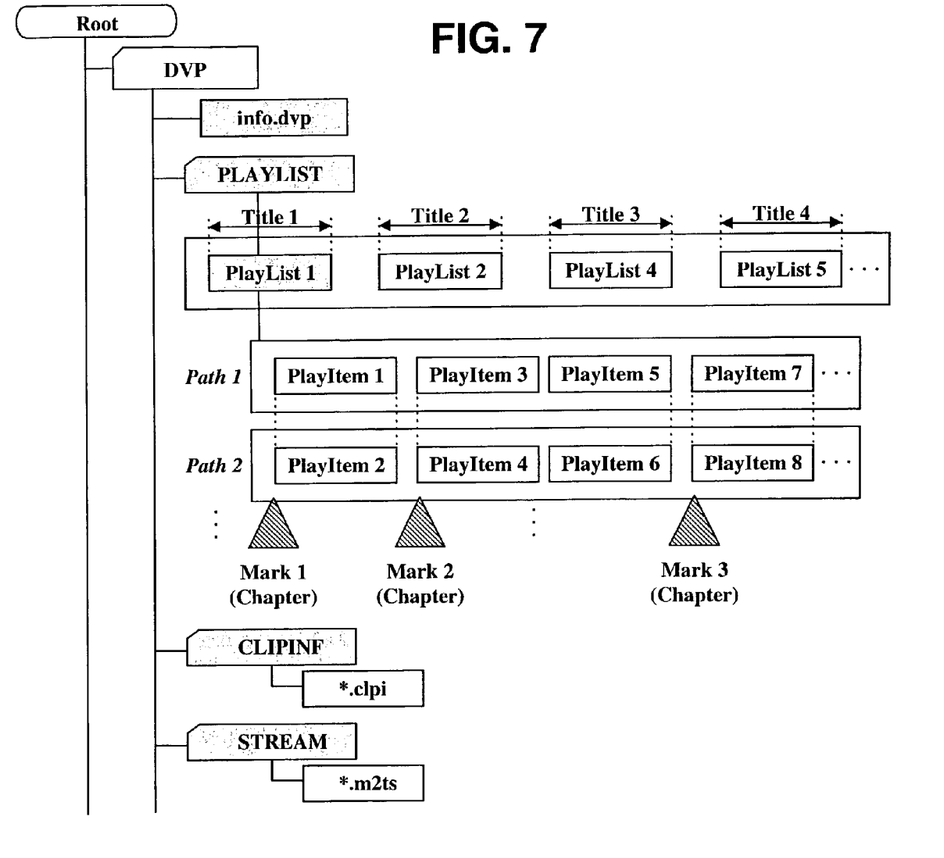
FIGS. 7 to 9 illustrate a second embodiment of a recording medium having a data or file structure for managing reproduction of at least video data in accordance with the present invention.
Figure 8:
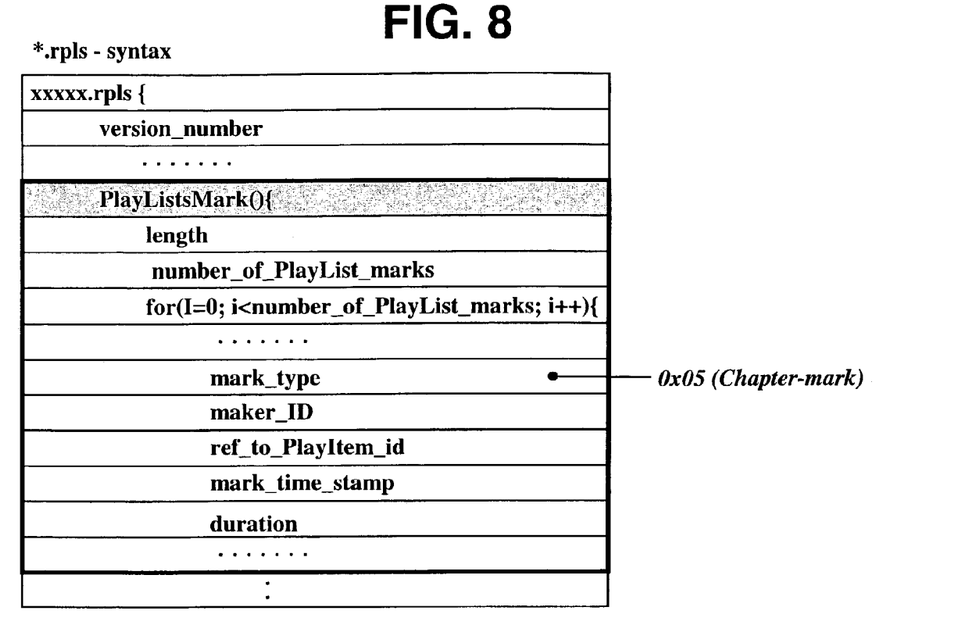
Figure 9:
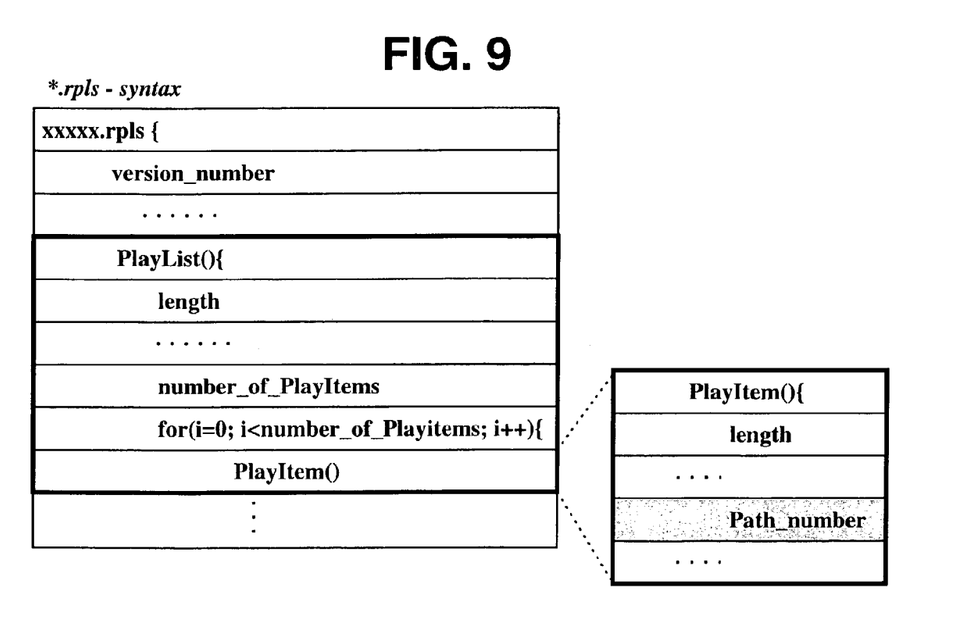

FIGS. 7-9 illustrate a second embodiment of the data structure according to the present invention. As shown in FIG. 7, the data structure of the second embodiment is the same as the data structure of the first embodiment, except for the chapter management information. FIG. 7 illustrates that the chapter management information indicates chapters through the use of chapter marks. As with FIG. 2, FIG. 7 also represents the areas of the recording medium, and FIG. 10 illustrates an exemplary embodiment of the recording medium including these areas.

In this embodiment, the playlist files include the chapter management information. FIG. 8 illustrates a portion of a playlist file including the chapter management information according to this embodiment. As shown, each playlist file includes a playlist mark 'PlayListsMark' information field. The playlist mark 'PlayListsMark' information field indicates a length of the information field and a number of the playlist marks 'number_of_PlayList_marks' in the playlist. For each playlist mark, the playlist mark 'PlayListsMark' information field indicates the mark type 'mark_type', the mark name length 'mark_name_length', the maker 'maker_ID', an indicator of the playitem on which the mark is placed 'ref_to_PlayItem_id', and a time stamp 'mark_time_stamp'.

The mark type indicates the type of mark. For example, when a mark indicates the beginning of a chapter, the mark type 'mark_type' identifies the associated mark as a chapter mark. The maker identifier 'maker_ID' identifies the manufacturer of the mark. The playitem indicator 'ref_to_PlayItem_id' indicates the Playitem_id value for a playitem on which the mark is placed. The time stamp 'mark_time_stamp' of the mark indicates a point where the mark is placed; namely, indicates a point on a time axis of the A/V stream of clips (e.g., ATC and/or STC basis) where the mark is placed. The 'duration' indicates the length of the mark that starts from the time stamp indicated by the 'mark_time_stamp'.

Because the playlist mark information field provides the chapter management information, the chapter entry flag 'Chapter_entry_flag' of the first embodiment is not required. FIG. 9 illustrates a portion of the playlist file showing that the playitems of this embodiment do not include the chapter entry flag 'Chapter_entry_flag'. However, it will be understood that the chapter entry flag 'Chapter_entry_flag' could be provided.

The recording and reproducing apparatus of FIG. 6 operates in the same manner with respect to the embodiment of FIGS. 7-9 as was described above with respect to FIGS. 2-5. However, with respect to the embodiment FIGS. 7-9, the chapter management information of FIG. 8 is recorded and used during reproduction to selectively begin reproduction at a particular chapter. Here, the controller 10 determines the number of chapters in a title based on the number of playlist marks identified as chapter marks, queries the user to select a chapter, and begins reproduction of the video data at the point indicated by the time stamp associated with the chapter mark of the selected chapter.

As will be appreciated from the forgoing disclosure, the present invention provides a recording medium have a file or data structure that permits managing the reproduction of video data on a title, chapter, and or multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk, the present invention is not limited to this standard of optical disk or to optical disks. It is intended that all such modifications and variations fall within the spirit and scope of the invention.

What is claimed is:

1. An optical disc having a data structure for managing reproduction of video data having multiple reproduction paths, the optical disc comprising:
   a first file including,
      first information for reproducing a unit of the video data using a first identifier identifying a second file, the unit identified by the second file, and
      second information for reproducing a title unit of the video data using a second identifier identifying the title unit of the video data;
   the second file stored as a separate file from the first file, the second file including,
      at least one playitem including a pair of an in-time and an out-time, the pair identifying a playing interval in the clip, the playitem including information indicating a reproduction path of the multiple reproduction paths, and
      mark information including a first field indicating a number of marks in the second file, the mark information including a second field indicating a type of mark in the second file;
   a third file including timing information of the clip; and
   a fourth file including source packets of the clip.

2. The optical disc of claim 1, wherein the title corresponds to one second file.

3. The optical disc of claim 1, wherein the second file includes path management information for managing the multiple reproduction paths of the video data.

4. The optical disc of claim 3, wherein the second file includes a mark for identifying a chapter of the video data.

5. The optical disc of claim 4, wherein the mark indicates the beginning of the chapter.

6. The optical disc of claim 5, wherein the mark includes a chapter identifier indicating a chapter associated with the mark and a timestamp indicating a time in the multiple reproduction path video data when the chapter begins.

7. A method of recording a data structure for managing reproduction of video data having multiple reproduction paths on a recording medium, the method comprising:
   recording, with a recording apparatus, a first file on the recording medium, the first file including, first information for reproducing a unit of the video data using a first identifier identifying a second file, the unit identified by the second file, and second information for reproducing a title unit of the video data using a second identifier identifying the title unit of the video data;

recording, with the recording apparatus, the second file on the recording medium, the second file being stored as a separate file from the first file, the second file including, at least one playitem including a pair of an in-time and an out-time, the pair identifying a playing interval in the clip, the playitem including information indicating a reproduction path of the multiple reproduction paths, and mark information including a first field indicating a number of marks in the second file, the mark information including a second field indicating a type of mark in the second file;

recording, with the recording apparatus, a third file including timing information of the clip on the recording medium; and recording, with the recording apparatus, a fourth file including source packets of the clip on the recording medium.

8. A method of reproducing a data structure for managing reproduction of video data having at least multiple reproduction path recorded on a recording medium, the method comprising:

reproducing, with a reproducing apparatus, a first file from the recording medium, the first file including, first information for reproducing a unit of the video data using a first identifier identifying a second file, the unit identified by the second file, and second information for reproducing a title unit of the video data using a second identifier identifying the title unit of the video data;

reproducing, with the reproducing apparatus, the second file from the recording medium, the second file being stored as a separate file from the first file, the second file including, at least one playitem including a pair of an in-time and an out-time, the pair identifying a playing interval in the clip, the playitem including information indicating a reproduction path of the multiple reproduction paths, and mark information including a first field indicating a number of marks in the second file, the mark information including a second field indicating a type of mark in the second file; and reproducing, with the reproducing apparatus, a third file including timing information of the clip from the recording medium; and reproducing, with the reproducing apparatus, a fourth file including source packets of the clip from the recording medium.

9. An apparatus for recording a data structure for managing reproduction of video data having multiple reproduction paths on a recording medium, the apparatus comprising:

a recording device configured to record data on the recording medium; and a controller configured to control the recording device to, record a first file on the recording medium, the first file including, first information for reproducing a unit of the video data using a first identifier identifying a second file, the unit identified by the second file, and second information for reproducing a title unit of the video data using a second identifier identifying the title unit of the video data, record the second file, the second file being stored as a separate file from the first file, the second file including, at least one playitem including a pair of an in-time and an out-time, the pair identifying a playing interval in the clip, the playitem including information indicating a reproduction path of the multiple reproduction paths, and mark information including a first field indicating a number of marks in the second file, the mark information including a second field indicating a type of mark in the second file, record a third file including timing information of the clip on the recording medium, and record a fourth file including source packets of the clip on the recording medium.

10. An apparatus for reproducing a data structure for managing reproduction of at least multiple reproduction path video data, the apparatus comprising:

a reproducing device configured to reproduce data recorded on a recording medium; and a controller operably coupled to the reproducing device, the controller configured to control the reproducing device to, reproduce a first file from the recording medium, the first file including, first information for reproducing a unit of the video data using a first identifier identifying a second file, the unit identified by the second file, and second information for reproducing a title unit of the video data using a second identifier identifying the title unit of the video data, reproduce the second file, the second file being stored as a separate file from the first file, the second file including, at least one playitem including a pair of an in-time and an out-time, the pair identifying a playing interval in the clip, the playitem including information indicating a reproduction path of the multiple reproduction paths, and mark information including a first field indicating a number of marks in the second file, the mark information including a second field indicating a type of mark in the second file, reproduce a third file including timing information for the clip from the recording medium, and reproduce a fourth file including source packets of the clip from the recording medium.

11. The method of claim 7, wherein the second file includes a mark for identifying a chapter of the video data.

12. The method of claim 11, wherein the mark indicates the beginning of the chapter.

13. The method of claim 12, wherein the mark includes a chapter identifier indicating a chapter associated with the mark and a timestamp indicating a time in the multiple reproduction path video data when the chapter begins.

14. The method of claim 8, wherein the second file includes a mark for identifying a chapter of the video data.

15. The method of claim 14, wherein the mark indicates the beginning of the chapter.

16. The method of claim 15, wherein the mark includes a chapter identifier indicating a chapter associated with the mark and a timestamp indicating a time in the multiple reproduction path video data when the chapter begins.

17. The apparatus of claim 9, wherein the second file includes a mark for identifying a chapter of the video data.

18. The apparatus of claim 17, wherein the mark indicates the beginning of the chapter.

19. The apparatus of claim 18, wherein the mark includes a chapter identifier indicating a chapter associated with the mark and a timestamp indicating a time in the multiple reproduction path video data when the chapter begins.

20. The apparatus of claim 10, wherein the second file includes a mark for identifying a chapter of the video data.

21. The apparatus of claim 20, wherein the mark indicates the beginning of the chapter.

22. The apparatus of claim 21, wherein the mark includes a chapter identifier indicating a chapter associated with the mark and a timestamp indicating a time in the multiple reproduction path video data when the chapter begins.

* * * * *